Figure 1:
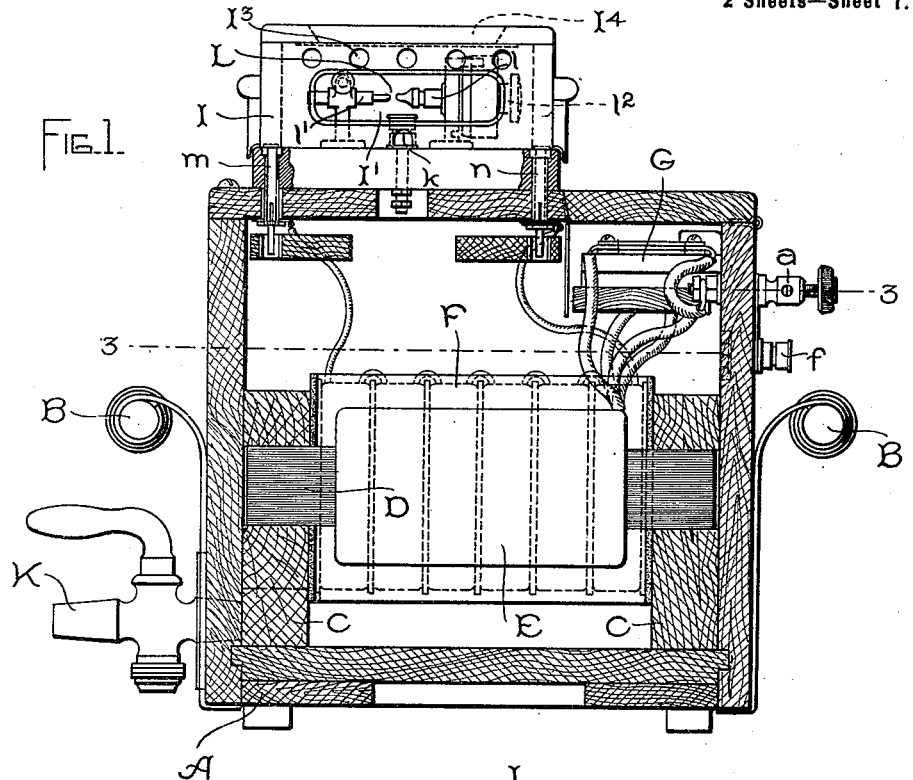

No. 659,656. Patented Oct. 16, 1900.
A. R. EVEREST.
TESTING TRANSFORMERS, &c.
(Application filed June 25, 1898.)
(No Model.) 2 Sheets—Sheet 1.

WITNESSES
Edw. Williams
A. J. Macdonald

INVENTOR
Augustine R. Everest

No. 659,656. Patented Oct. 16, 1900.
A. R. EVEREST.
TESTING TRANSFORMERS, &c.
(Application filed June 25, 1898.)
(No Model.) 2 Sheets—Sheet 2.
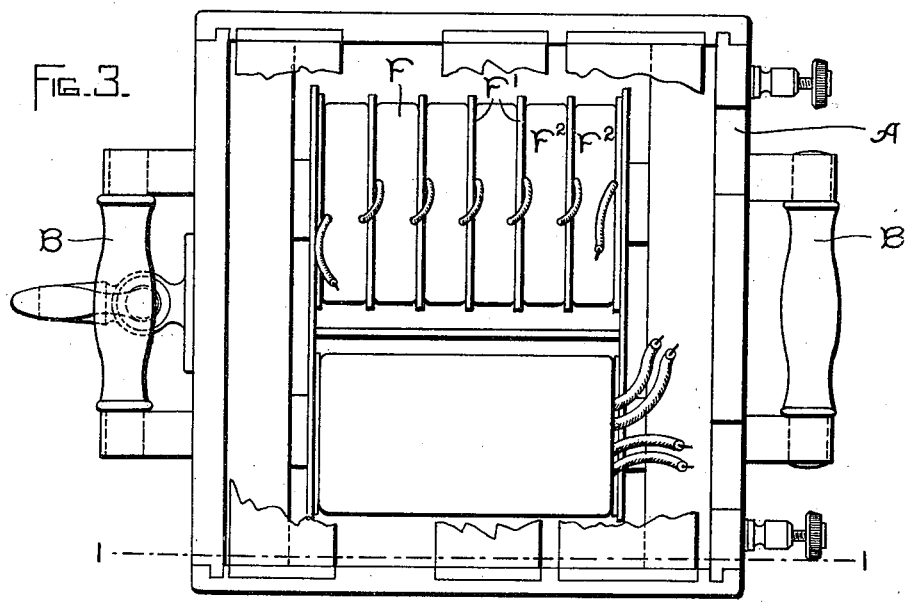
Fig. 3.
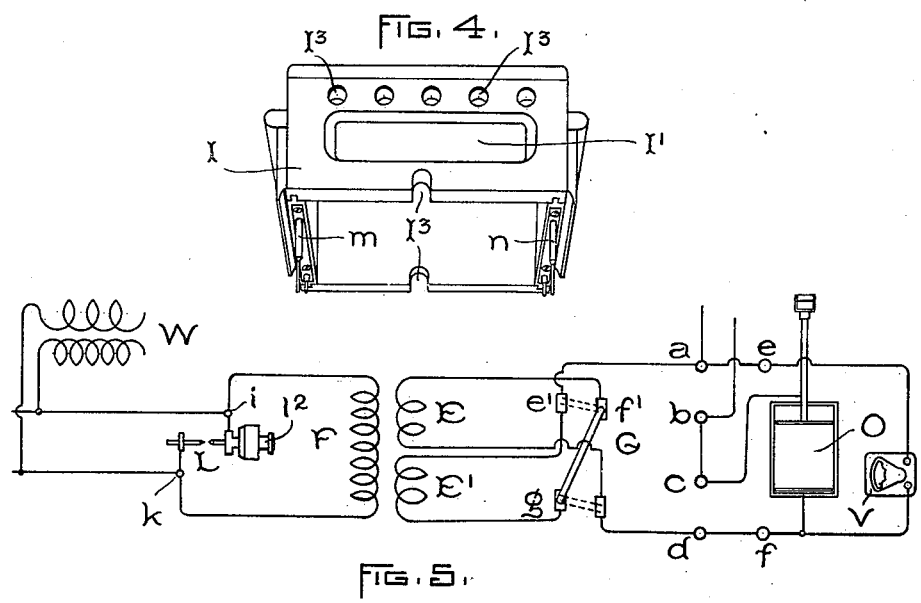
Fig. 4.
Fig. 5.
WITNESSES
Edw Williams
A. F. Macdonald
INVENTOR
Augustine R. Everest

UNITED STATES PATENT OFFICE.

AUGUSTINE R. EVEREST, OF LYNN, MASSACHUSETTS, ASSIGNOR TO THE GENERAL ELECTRIC COMPANY, OF NEW YORK.

TESTING TRANSFORMERS, &c.

SPECIFICATION forming part of Letters Patent No. 659,656, dated October 16, 1900.

Application filed June 25, 1898. Serial No. 684,488. (No model.)

*To all whom it may concern:*

Be it known that I, AUGUSTINE R. EVEREST, a subject of the Queen of Great Britain, residing at Lynn, in the county of Essex, State of Massachusetts, have invented certain new and useful Improvements in Testing Transformers, &c., (Case No. 741,) of which the following is a specification.

My invention relates to devices for testing the insulation resistance of dynamo-electric apparatus, such as armatures, transformers, coils, and the like.

It has for its object to provide a convenient, and preferably-portable, testing set which may operate at any desired potential within the limits of the apparatus. It comprises, in brief, a transformer, the primary of which may be connected to mains at ordinary potentials and by simple change of connections be adapted to two or more different potentials, such as fifty-two or one hundred and four volts, which are pressures commonly used in alternating-current distributions, and a secondary upon the same core, with such a number of turns and size of wire as to have induced therein high potentials, in accordance with well-known principles. The device as I have embodied it in practice is designed to employ upon the high-potential side differences of potential of ten thousand volts; but of course I am not limited to any particular ratio. With this transformer, which is mounted in a convenient manner in a box, which box may be filled with oil for security, I combine upon the high-potential side a spark-gap in shunt to the mains and also convenient terminals by which a voltmeter may be connected in on the primary or low-potential side. In operation the apparatus the insulation of which is to be tested is connected in a suitable manner upon the high-potential side, and, the spark-gap having been previously adjusted so that the spark will leap at the desired potential, the current is turned onto the primary and the potential gradually raised until the spark jumps. This has the effect of short-circuiting the apparatus to be tested, so that any excess of potential cannot by accident be passed through it. Unlike some other devices, the spark-gap acts at the potential for which it has been adjusted at no load, irrespective of the relation of current and electromotive force in the circuit, so that the inductance of the transformer under load or of the apparatus which is to be tested will have no effect upon the potential at which the spark will pass.

Figure 2:
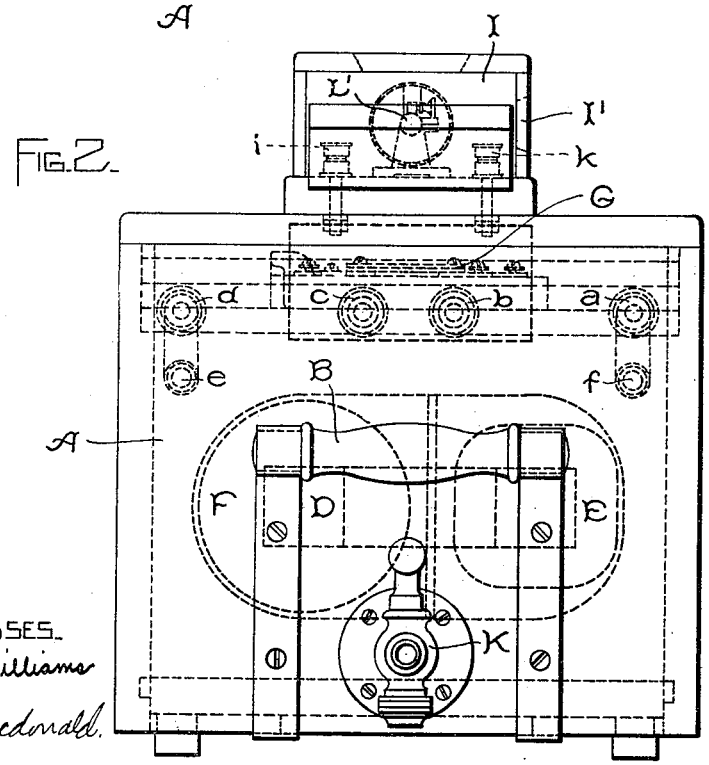

The drawings annexed show a testing-set in which my invention has been embodied, Figure 1 being a section on the line 1 1 of Fig. 3 of such an apparatus; Fig. 2, a side elevation; Fig. 3, a plan with the part above the line 3 3 of Fig. 1 removed; Fig. 4, a perspective of the inclosing box for the spark-gap, and Fig. 5 a diagram of the circuits.

In Figs. 1, 2, and 3 A is the box, of which B B are the handles. All of the apparatus is inclosed within the box, connection being made to the various terminals by the binding-posts $a \, b \, c \, d$ upon the outside of the box. At $e \, f$ are other binding-posts across the primary circuit for convenience in connecting in the voltmeter. (Not illustrated.) Upon blocks C C is supported the core D of the transformer, of which E is the primary coil and F the secondary or high-potential coil. The secondary is made of separately-wound coils $F^2 \, F^2$, between which are placed septum F', of insulating material, after which the coils are connected up. A connection-board G is provided by which the two windings of the primary E may be connected in series or multiple, according as the apparatus is used on one hundred and four or fifty-two volt-lines. A cock K is provided by which the oil may be readily removed from the apparatus for transportation.

In Figs. 1, 2, and 4 the box surrounding the spark-gap L is shown. This consists of a box I, provided with openings I' I$^4$, through which the sparking-terminals $l \, l'$ may be observed. These may be approached or separated by the micrometer-screw $l^2$, so that the gap L between the points may be adjusted as may be required. On the bottom of the box are the plug-terminals $m \, n$, by which when the box is lifted out the spark-gap is disconnected from circuit. The spark-gap may then be adjusted as required and the cover set back in place, thus obviating any risk from handling the apparatus while the high-potential current is flowing. Ordinarily a piece of glass would be inserted in the opening I', through which the spark might be observed. Ventilating-holes I³ are provided in the box in suitable locations.

In Fig. 5 the circuits of the apparatus are illustrated diagrammatically. Current enters, for instance, at the binding-post $a$ and, in the illustrated arrangement of the circuits, passes first through the coil E' of the primary to the contact $g$, then to contact $f'$, and through the coil E to the binding-post $d$, thence through the water-rheostat O, used to limit the current and to adjust the primary potential, to the binding-post $c$, and out at the binding-post $b$. The voltmeter V, as shown diagrammatically, is connected across the mains to the posts $a$ $b$, additional binding-posts $e$ $f$ being employed, so that it may be disconnected readily without interfering with the main circuits. If the dotted-line connection at the board G is employed, the coils E E' are connected in multiple, so that the apparatus will be adapted for line-current of lower potential. A high potential is thus induced in the coil F and through the mains. This difference of potential is communicated to the apparatus W to be tested. The latter is represented diagrammatically as a transformer, the primary coil of which is connected to one line and the secondary to the other, so that the insulation between the two coils is under strain of ten thousand volts' difference of potential. The spark-gap L is connected between the plug-terminals $i$ $k$.

The method of operation is as follows: With the connections as shown in Fig. 5, the apparatus to be tested not in circuit, and the voltmeter in (the ratio of transformation being known) the current is turned on and the voltmeter is brought to a proper indication, such as "52" or "104" in the cases already used as illustrative. The spark-gap L is then adjusted until when the voltmeter stands at its proper indication the spark will just pass. Current is then turned off and the apparatus to be tested connected. The voltmeter, if desired, may be cut out, although this is unimportant, as it is under only moderate strain. After the current is again turned on the plates of the water-rheostat will be gradually approached until the spark jumps at the gap L. This, as already pointed out, will short-circuit the apparatus to be tested, which will thus be protected against any excess of voltage. As already briefly pointed out in the statement of invention, the sparking-point is unaffected by the character of the load.

What I claim as new, and desire to secure by Letters Patent of the United States, is—

1. An insulation-testing device comprising a step-up transformer, an adjustable spark-gap across the secondary terminals, and terminals for the device to be tested in parallel with the spark-gap, whereby the latter may short-circuit the dielectric medium of the device to be tested at a determinate potential and prevent discharge through the same.

2. The combination of spark-gap terminals of an inclosing case protecting the battery from contact with the terminals, connections for the terminals fixed to the case, and terminal contacts in the main circuit so arranged that removing the case from its support breaks the contact and cuts the spark-gap out of circuit.

3. A testing-set comprising a transformer with primary and secondary windings, a spark-gap across the high-potential leads in shunt to the apparatus to be tested, an inclosing box for the spark-gap terminals, and connections fixed to the box by which the spark-gap is cut out of circuit when the box is removed from the transformer-case.

4. The combination of a case, a transformer with primary and secondary windings in the case, terminals connecting the primary winding to the supply-leads, auxiliary binding-posts in circuit with the main terminals, secondary leads, a spark-gap in shunt to the secondary leads, an inclosing case for the spark-gap, and terminals upon the case registering with fixed terminals upon the transformer-case; the arrangement being such that the removal of the spark-gap and its inclosing case breaks the shunt-circuit.

In witness whereof I have hereunto set my hand this 23d day of June, 1898.

AUGUSTINE R. EVEREST.

Witnesses:
 DUGALD McKILLOP,
 WILLIAM J. WOOLDRIDGE.